US012643180B2

(12) United States Patent
Vierstraete

(10) Patent No.: US 12,643,180 B2
(45) Date of Patent: Jun. 2, 2026

(54) METHOD FOR PREPARING A PRECOATED SHEET AND ASSOCIATED INSTALLATION

(71) Applicant: ArcelorMittal, Luxembourg (LU)

(72) Inventor: René Vierstraete, Maisons-Laffitte (FR)

(73) Assignee: ArcelorMittal, Luxembourg (LU)

( * ) Notice: Subject to any disclaimer, the term of this patent is extended or adjusted under 35 U.S.C. 154(b) by 1170 days.

(21) Appl. No.: 16/301,357

(22) PCT Filed: May 23, 2017

(86) PCT No.: PCT/IB2017/053038
§ 371 (c)(1),
(2) Date: Nov. 13, 2018

(87) PCT Pub. No.: WO2017/203431
PCT Pub. Date: Nov. 30, 2017

(65) Prior Publication Data
US 2019/0193209 A1 Jun. 27, 2019

(30) Foreign Application Priority Data

May 23, 2016 (WO) .................. PCT/IB2016/053017

(51) Int. Cl.
B23K 26/60 (2014.01)
B23K 9/235 (2006.01)
(Continued)

(52) U.S. Cl.
CPC .............. B23K 26/60 (2015.10); B23K 9/235 (2013.01); B23K 26/354 (2015.10);
(Continued)

(58) Field of Classification Search
CPC .................. B23K 26/60; B23K 26/354; B23K 2103/166; B23K 9/235; B23K 26/361;
(Continued)

(56) References Cited

U.S. PATENT DOCUMENTS 3,989,919 A * 11/1976 Wefers ................. B23K 11/163
219/94
5,098,005 A * 3/1992 Jack ................... B23K 26/0838
228/49.4
(Continued)

FOREIGN PATENT DOCUMENTS

CN 105050760 A 11/2015
DE 102006029292 A1 * 12/2007 ......... B23K 26/0869
(Continued)

OTHER PUBLICATIONS

Shinoda Tomonori, KR 20060052623 (Year: 2006).*
(Continued)

*Primary Examiner* — Edward F Landrum
*Assistant Examiner* — Erwin J Wunderlich
(74) *Attorney, Agent, or Firm* — Davidson Kappel LLC

(57) ABSTRACT

A method for preparing a precoated sheet is provided. The method includes providing a precoated sheet having a metallic substrate with a precoating on at least one of its faces and removing through laser ablation at least a portion of the precoating on the at least one face of the precoated sheet in a removal zone. The ablation step is carried out in an installation. The installation includes at least one protective element having a protective surface. During the ablation step, the protective surface contacts the precoated sheet in a contact area in register with the laser beam as the laser beam removes the portion of the precoating. A plane tangent to the protective surface at the contact area forms a dihedral angle with the plane of the face of the precoated sheet. This angle is strictly smaller than 90°.

35 Claims, 7 Drawing Sheets

(51) Int. Cl.

| | |
|---|---|
| *B23K 26/16* | (2006.01) |
| *B23K 26/354* | (2014.01) |
| *B23K 26/361* | (2014.01) |
| *B23K 26/362* | (2014.01) |
| *B23K 26/38* | (2014.01) |
| *B23K 26/40* | (2014.01) |
| *B23K 26/70* | (2014.01) |
| *B23K 31/10* | (2006.01) |
| *B23K 103/16* | (2006.01) |

(52) U.S. Cl.
CPC ............ *B23K 26/361* (2015.10); *B23K 26/40* (2013.01); *B23K 26/70* (2015.10); *B23K 26/702* (2015.10); *B23K 31/10* (2013.01); *B23K 26/16* (2013.01); *B23K 26/362* (2013.01); *B23K 26/38* (2013.01); *B23K 2103/166* (2018.08)

(58) Field of Classification Search
CPC ...... B23K 26/40; B23K 26/702; B23K 31/10; B23K 26/362; B23K 26/38; B23K 26/70; B23K 26/16
See application file for complete search history.

(56) References Cited

U.S. PATENT DOCUMENTS

| | | | |
|---|---|---|---|
| 5,662,762 A * | 9/1997 | Ranalli | B29C 63/0013 |
| | | | 156/707 |
| 5,823,417 A * | 10/1998 | Johnson | B23K 26/037 |
| | | | 228/44.3 |
| 8,471,173 B2 * | 6/2013 | Miessbacher | B23K 35/3053 |
| | | | 219/136 |
| 8,585,391 B2 | 11/2013 | Kim et al. | |
| 8,614,008 B2 | 12/2013 | Canourgues et al. | |
| 9,278,408 B2 * | 3/2016 | Kato | B23K 26/142 |
| 10,821,546 B2 * | 11/2020 | Evangelista | B23K 26/40 |
| 2007/0184705 A1 | 8/2007 | Bourdin et al. | |

| | | | |
|---|---|---|---|
| 2008/0092312 A1 * | 4/2008 | Prasad | B23D 79/02 |
| | | | 15/104.001 |
| 2013/0087538 A1 * | 4/2013 | Walter | B23K 26/00 |
| | | | 219/121.64 |
| 2013/0251876 A1 * | 9/2013 | Nagayama | A23L 7/113 |
| | | | 426/503 |
| 2013/0316185 A1 * | 11/2013 | Evangelista | B23K 26/36 |
| | | | 219/121.69 |
| 2014/0238961 A1 | 8/2014 | Kato | |
| 2014/0270922 A1 * | 9/2014 | Evangelista | B23K 9/0026 |
| | | | 219/136 |
| 2015/0239053 A1 * | 8/2015 | Flehmig | B23D 1/26 |
| | | | 409/303 |
| 2017/0182603 A1 * | 6/2017 | Alber | B23K 37/0408 |
| 2020/0130019 A1 * | 4/2020 | Plöckl | B08B 1/34 |

FOREIGN PATENT DOCUMENTS

| | | | | | |
|---|---|---|---|---|---|
| EP | 1010493 A1 * | 6/2000 | ............ | B23K 26/14 |
| EP | 1985403 A1 * | 10/2008 | ........... | B08B 7/0042 |
| EP | 2007545 B1 | 7/2009 | | |
| EP | 1985403 B1 * | 5/2011 | ............ | B23K 26/16 |
| JP | 2014161895 A1 | 9/2014 | | |
| KR | 20060052623 A * | 5/2006 | ........... | H01L 23/544 |
| RU | 2382693 C1 | 2/2010 | | |
| RU | 2425742 C2 | 8/2011 | | |
| WO | WO-2016037728 A1 * | 3/2016 | ............ | B23K 26/02 |

OTHER PUBLICATIONS

Herselman C J, EP1985403 (Year: 2008).*
DE-102006029292-A1 english description (Year: 2007).*
WO-2016037728-A1 english description (Year: 2016).*
EP-1010493-A1 english description (Year: 2000).*
DE-102006029292-A1 English translation (Year: 2007).*
Machine English translation of EP-1985403-B1 (Year: 2011).*
Search Report issued in connection with International Application No. PCT/IB2017/053038 on Jun. 9, 2017.
Search Report issued in connection with International Application No. PCT/IB2016/053017 on Jun. 9, 2017.

\* cited by examiner

200 μm

METHOD FOR PREPARING A PRECOATED SHEET AND ASSOCIATED INSTALLATION

The present invention relates to a method for preparing a precoated sheet in view of its welding to another sheet, the method comprising the following successive steps:

providing a precoated sheet comprising a metallic substrate provided with a precoating on at least one of its faces;

removing through laser ablation at least a portion of the precoating on said at least one face of the precoated sheet in a removal zone, said laser ablation being performed in a direction of ablation, said ablation step being carried out in an installation.

BACKGROUND OF THE INVENTION

In order to improve their resistance to oxidation, sheets made of press-hardenable steels are usually coated with a pre-coating, in particular an aluminum-based precoating. Such precoated sheets can be welded to other sheets, for example other precoated sheets, and these welded sheets are then hot-formed and press-hardened to their final shape.

When such precoated sheets are being welded to other sheets, a part of the precoating is molten into the weld metal created between those sheets by welding.

This exogenous metal can result in the formation of intermetallic areas, which, on subsequent mechanical loading, tend to be the site of fracture initiation under static or dynamic conditions.

Moreover, since aluminum is an alphagene element, it delays the transformation into austenite of the molten area during the heating preceding the hot forming of the welded sheet. Therefore, in this case, it is not possible to obtain a weld joint having a completely quenched structure after press-hardening, and the thus obtained weld joint therefore has a lower hardness and tensile strength than the sheets themselves.

EP 2 007 545 discloses a method for preventing the above disadvantages by removing a portion of the precoating in the area of the weld through laser ablation prior to welding.

Under the plasma pressure of the laser beam, the coating is molten and vapourized and flows radially from the laser beam's central axis, in the direction perpendicular to the displacement of the laser beam. The inventors of the present invention have now observed that the laser ablation of the precoating results in the accumulation of material from the precoating on the edge of the removal zone, creating a build-up of material from the precoating on this edge.

Such a build-up is generally not desirable.

First, the build-up protrudes beyond the surface of the precoated sheet, which is detrimental for the stacking and further treatment of the thus prepared sheets. Indeed, especially when numerous sheets are ablated and stacked, due to these protrusions, the sheets do not lie flat on each other, which might result in a permanent deformation of the sheets within the stack.

Furthermore, the presence of such a protrusion is detrimental to the automatic manipulation of the prepared precoated sheets by take-up robots.

Moreover, the build-up can be brittle and may break off while welding the prepared precoated sheets and might be introduced into the weld bath. Since the build-up is made up of the material of the precoating, this can introduce unwanted constituents from the precoating into the weld bath, which can weaken the final weld bead due to the phenomena explained above.

Finally, welding systems generally use weld joint tracking systems, which track the weld joint and automatically adjust the position of the weld beam depending on the detected position of the weld joint. These tracking systems generally use vision algorithms for tracking the position of the weld joint. These vision algorithms may confuse the build-up with the location of the joint, which may have a detrimental effect on the quality of the weld. Similarly, the build-up may also disturb the operation of the vision algorithms used for controlling the quality of the welds, which might result in non-compliant welds being accepted by the control systems.

As a consequence, this build-up due to laser ablation should be reduced or even eliminated prior to welding the precoated steel sheets.

BRIEF SUMMARY OF THE INVENTION

An object of the invention is to provide a method for preparing a precoated sheet intended to be welded to another sheet, which results in an improved quality of the welded parts.

Preferably, the method according to the invention should eliminate the build-up completely or at least reduce its volume size, the volume of the build-up being characterized by its width and its height) such that it does not protrude by more than 100 micrometers beyond the surface of the sheet.

The invention provides a method as disclosed above, wherein said installation comprises at least one protective element comprising a protective surface, and, during the ablation step, the protective surface contacts the precoated sheet in a contact area located in register with the laser beam as the laser beam removes the at least one portion of the precoating through ablation, whereby a plane tangent to said protective surface at the contact area forms a dihedral angle with the plane of said face of said precoated sheet, said dihedral angle being strictly smaller than 90°.

In certain embodiments, the method may further comprise one or more of the following features:

The dihedral angle α is defined as the angle between the portion of the face of the precoated sheet located on the inside of the contact area and the portion of said tangent plane P extending away from the precoated sheet;

The method comprises, simultaneously to the laser ablation, the blowing, by means of a blowing nozzle, of a jet of gas at the back of the laser beam, said jet of gas being directed in a downstream direction relative to the direction of ablation;

The dihedral angle α is smaller than or equal to 45°;

The dihedral angle α is greater than or equal to 5°;

The distance between the edge of the precoated sheet at which the ablation is being performed and an edge of the protective surface closest to the laser beam is comprised between 0.4 and 1.1 times the width of the removal zone;

The method further comprises, simultaneously to the laser ablation, the suction, by means of an aspiration nozzle, of material generated by the ablation at the front of the laser beam;

The protective surface is intended to be located on the trajectory of the precoating material ejected sideward toward the inner edge of the removal area during ablation such that the ejected precoated material is projected onto the protective surface rather than onto the precoated sheet;

For the protective element, the ratio of the elastic modulus of the material forming the protective element to the thickness of the protective element is comprised between 50 GPa·mm$^{-1}$ and 150 GPa·mm$^{-1}$;

The protective surface is planar;

The protective surface is curved, and for example concave with a concavity oriented towards the laser beam;

The ablation step comprises a relative displacement of the protective surface relatively to the precoated sheet as the laser beam removes the at least one portion of the precoating through ablation;

The contact between the precoated sheet and the protective surface is a sliding contact;

The protective surface is fixed in position relative to the precoated sheet during the ablation step;

The protective element is a protective blade and the protective surface is formed on a transverse edge surface of said protective blade, extending parallel to the direction of ablation;

A back corner of the protective blade relative to the direction of ablation is provided with a scraper, said scraper scraping along the face of the precoated sheet so as to remove the traces of projected material from the precoating which may have been projected between the protective blade and the face of the precoated sheet;

The protective element moves relatively to the laser beam during the ablation step;

The installation further comprises a brush which brushes the protective surface during the ablation step;

The protective element is a wheel, which rotates about a wheel axis during the ablation step, the wheel comprising a circumferential edge surface comprising the protective surface;

The protective element is an endless belt comprising an outer transverse edge surface extending parallel to the ablation direction and comprising the protective surface, wherein the endless belt is moved relatively to the laser beam during the ablation step;

The endless belt is an articulated belt comprising a plurality of belt elements;

The installation further comprises an endless drive element and the protective element is formed by a plurality of elongated tabs, distributed along the circumference of the endless drive element, each elongated tab having a first end attached to said endless drive element and a second free end located opposite the first end, each second free end comprising an end surface, the end surfaces of the second free ends of the elongated tabs jointly forming a radially outer edge surface of the protective element comprising the protective surface, the elongated tabs being moved by the endless drive element relatively to the laser beam during the ablation step;

The precoating is chosen among a layer of aluminum, a layer of aluminum alloy and a layer of aluminum-based alloy;

The axis of the laser beam during the ablation step is inclined relatively to the normal to the face of the precoated sheet.

The invention further provides an installation intended to be used for carrying out the method as disclosed above, comprising:

a laser configured for emitting a laser beam for removing at least a portion of a precoating of a precoated sheet through ablation, and a protective element comprising a protective surface, said protective surface being configured for contacting the precoated sheet in a contact area located in register with the laser beam as the laser beam removes the at least one portion of the precoating through ablation and the protective surface being arranged within the installation such that a plane tangent to said protective surface at the contact area forms a dihedral angle with the plane of said face of the precoated sheet, said dihedral angle being strictly smaller than 90°.

In certain embodiments, the installation according to the invention may further comprise one or more of the following features:

This installation further comprises a blowing nozzle, configured for blowing a jet of gas at the back of the laser beam, said jet of gas being directed in a downstream direction relative to the direction of ablation;

The dihedral angle is smaller or equal to 45°;

The distance between the edge of the precoated sheet at which the ablation is being performed and an edge of the protective surface closest to the laser beam is comprised between 0.4 and 1.1 times the width of the intended removal zone;

The protective element is a protective blade, the protective surface being formed on a transverse edge surface of said protective blade, extending parallel to the direction of ablation;

A back corner of the protective blade relative to the direction of ablation is provided with a scraper, said scraper being configured for scraping along the face of the precoated sheet so as to remove the traces of projected material from the precoating which may have been projected between the protective blade and the face of the precoated sheet;

The protective element is movable relatively to the laser beam;

The installation further comprises a brush configured for brushing the protective surface during laser ablation;

The protective element is a wheel, the wheel comprising a circumferential surface comprising the protective surface, the wheel being rotatable about a wheel axis;

The protective element is an endless belt comprising an outer transverse edge surface extending parallel to the ablation direction and comprising the protective surface, the endless belt being movable relatively to the laser beam;

The installation further comprises an endless drive element and the protective element is formed by a plurality of elongated tabs, distributed along the circumference of the endless drive element, each elongated tab having a first end attached to said endless drive element and a second free end located opposite the first end, each second free end comprising an end surface, the end surfaces of the second free ends of the elongated tabs jointly forming a radially outer edge surface of the protective element comprising the protective surface, the endless drive element being configured for moving the elongated tabs relatively to the laser beam.

BRIEF DESCRIPTION OF THE DRAWINGS

The invention will be better understood upon reading the following description, given only by way of example, with reference to the appended drawings, where.

DETAILED DESCRIPTION OF THE INVENTION

In the context of this patent application, the words "inside" and "outside" or "inner" and "outer" are used relative to the edge of the sheet where the precoating is being removed, "inner" or "inside" referring to an area of the precoated sheet 1 which is further away from this edge than "outer" or "outside". The "inwards" and "outwards" directions are shown by arrows in FIG. 3.

In FIGS. 2 to 6, an (x, y, z) base has been defined, wherein the x and y axes define a plane which coincides with the plane of the face 12 of the precoated sheet 1, the x axis extending perpendicular to the edge of the sheet where the precoating is being removed and away from the sheet, i.e. towards the outside according to the above definition and the y axis extending in the direction of ablation A. The z axis extends substantially perpendicular to the face 12 of the precoated sheet 1 away from the sheet 1, i.e. upwards in the example shown in the figures.

The present invention provides a method for preparing a precoated sheet 1 in view of its welding to another sheet 1, and for example to another precoated sheet prepared in an analogous manner.

Figure 1:
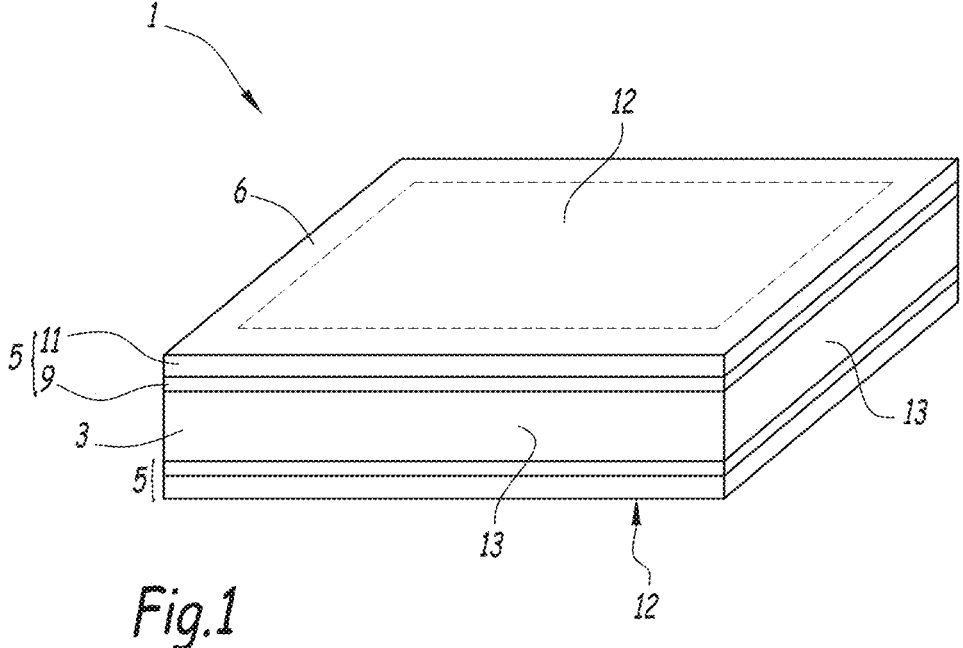
FIG. 1 is a schematic perspective representation of a precoated sheet.

This method comprises a first step of providing a precoated sheet 1, an example of which is shown in FIG. 1.

In the context of the invention, the term "sheet" is to be understood in a broad sense and designates, in particular, any strip, sheet or object obtained by cutting from a strip, a coil or a sheet.

In the particular embodiment shown in FIG. 1, the sheet has two faces 12 and four edges 13. The invention is not limited to this rectangular geometry.

As shown in FIG. 1, the precoated sheet 1 comprises a metallic substrate 3 provided on at least one of its faces, with a precoating 5. The precoating 5 is superimposed on the substrate 3 and in contact therewith.

The metallic substrate 3 is more particularly a steel substrate.

The steel of the substrate 3 is more particularly a steel having a ferrito-perlitic microstructure.

The substrate 3 is advantageously a steel intended for thermal treatment, more particularly a press-hardenable steel, and for example a manganese-boron steel, such as a 22 MnB5 type steel.

According to one embodiment, the steel of the substrate 3 comprises, by weight:

$0.10\% \leq C \leq 0.5\%$ $0.5\% \leq Mn \leq 3\%$ $0.1\% \leq Si \leq 1\%$ $0.01\% \leq Cr \leq 1\%$ $Ti \leq 0.2\%$ $Al \leq 0.1\%$ $S \leq 0.05\%$ $P \leq 0.1\%$ $B \leq 0.010\%$ the rest being iron and impurities resulting from manufacturing.

More particularly, the steel of the substrate 3 comprises, by weight:

$0.15\% \leq C \leq 0.25\%$ $0.8\% \leq Mn \leq 1.8\%$ $0.1\% \leq Si \leq 0.35\%$ $0.01\% \leq Cr \leq 0.5\%$ $Ti \leq 0.1\%$ $Al \leq 0.1\%$ $S \leq 0.05\%$ $P \leq 0.1\%$ $B \leq 0.005\%$ the rest being iron and impurities resulting from manufacturing.

According to an additional embodiment, the steel of the substrate 3 comprises, by weight:

$0.040\% \leq C \leq 0.100\%$ $0.8\% \leq Mn \leq 2.00\%$ $Si \leq 0.30\%$ $S \leq 0.005\%$ $P \leq 0.030\%$ $0.010\% \leq Al \leq 0.070\%$ $0.015\% \leq Nb \leq 0.100\%$ $Ti \leq 0.080\%$ $N \leq 0.009\%$ $Cu \leq 0.100\%$ $Ni \leq 0.100\%$ $Cr \leq 0.100\%$ $Mo \leq 0.100\%$ $Ca \leq 0.006\%$, the rest being iron and impurities resulting from manufacturing.

According to an additional embodiment, the steel of the substrate 3 comprises, by weight:

$$0.24\% \leq C \leq 0.38\%$$

$$0.40\% \leq Mn \leq 3\%$$

$$0.10\% \leq Si \leq 0.70\%$$

$$0.015\% \leq Al \leq 0.070\%$$

$$0\% \leq Cr \leq 2\%$$

$$0.25\% \leq Ni \leq 2\%$$

$$0.015\% \leq Ti \leq 0.10\%$$

$$0\% \leq Nb \leq 0.060\%$$

$$0.0005\% \leq B \leq 0.0040\%$$

$$0.003\% \leq N \leq 0.010\%$$

$$0.0001\% \leq S \leq 0.005\%$$

$$0.0001\% \leq P \leq 0.025\%$$

wherein the titanium and nitrogen contents satisfy the following relationship:

$$Ti/N > 3.42,$$

and the carbon, manganese, chromium and silicon contents satisfy the following relationship:

$$2.6C + \frac{Mn}{5.3} + \frac{Cr}{13} + \frac{Si}{15} \geq 1.1\%$$

the steel optionally comprising one or more of the following elements:

$$0.05\% \leq Mo \leq 0.65\%$$

$$0.001\% \leq W \leq 0.30\%\%$$

$$0.0005\% \leq Ca \leq 0.005\%$$

the rest being iron and impurities inevitably resulting from manufacturing.

The substrate 3 may be obtained, depending on its desired thickness, by hot rolling, or by cold-rolling followed by annealing, or by any other appropriate method.

The substrate 3 advantageously has a thickness comprised between 0.5 mm and 4 mm, and in particular equal to about 1.5 mm.

The precoating 5 is obtained by hot-dip coating, i.e. by immersion of the substrate 3 into a bath of molten metal. It comprises an intermetallic alloy layer 9 in contact with the substrate 3 and a metallic alloy layer 11 extending over the intermetallic alloy layer 9.

The intermetallic alloy layer 9 is formed by reaction between the substrate 3 and the molten metal of the bath. It comprises an intermetallic compound comprising at least one element from the metallic alloy layer 11 and at least one element from the substrate 3. The thickness of the intermetallic alloy layer 9 is generally of the order of a few micrometers. In particular, its mean thickness is typically comprised between 2 and 7 micrometers.

The metallic alloy layer 11 has a composition which is close to that of the molten metal in the bath. It is formed by the molten metal carried away by the strip as it travels through the molten metal bath. It has, for example, a thickness comprised between 19 μm and 33 μm or between 10 μm and 20 μm.

The precoating 5 is advantageously a layer of aluminum, or a layer of aluminum alloy or a layer of aluminum-based alloy. In this case, the intermetallic alloy layer 9 comprises intermetallic compounds of the $Fe_x$—$Al_y$ type, and more particularly $Fe_2Al_5$.

In this context, an aluminum alloy refers to an alloy comprising more than 50% by weight of aluminum. An aluminum-based alloy is an alloy in which aluminum is the main element, by weight.

According to one embodiment, the precoating 5 is a layer of aluminum alloy further comprising silicon. According to one example, the metal alloy layer comprises, by weight:

$$-8\% \leq Si \leq 11\%$$

$$-2\% \leq Fe \leq 4\%,$$

the rest being aluminum and possible impurities.

The particular structure of the precoating 5 obtained by hot-dip coating is in particular disclosed in patent EP 2 007 545.

Advantageously, the substrate 3 is provided with such a precoating 5 on both of its faces 12.

Advantageously, the precoated sheet 1 provided in the first step of the method is obtained through cutting, in particular shearing or laser cutting, from a precoated strip having the above-mentioned features.

The step of providing the precoated sheet 1 is followed by an ablation step, during which at least one portion of the precoating 5 is removed by a laser beam on at least one face 12 of the precoated sheet 1 in a removal zone 6, the laser ablation being performed along a direction of ablation A.

The removal zone 6 is advantageously located at the periphery of the precoated sheet 1.

During this ablation step, in the removal zone 6, the precoating 5 is removed over its entire thickness or only over a fraction of its thickness.

According to one embodiment, in the removal zone, the metallic alloy layer 11 is entirely removed in the removal zone 6. Advantageously, at least a fraction of the thickness of the intermetallic alloy layer 9 remains in the removal zone 6.

The ablation step is carried out in an installation 20 which will now be described in detail prior to describing the ablation step itself.

The installation 20 comprises a laser, intended to emit a laser beam 22 for removing the at least one portion of the precoating 5 in the removal area 6 through ablation.

According to the invention, the installation 20 further comprises a protective element 26 comprising a protective surface 28.

The protective surface 28 is in particular intended to protect the precoated sheet 1 against the deposition thereon of material ejected from the precoating 5 during ablation by the laser beam 22.

It is intended to be located on the trajectory of the precoating material ejected sideward toward the inner edge 30 of the removal area 6 during ablation. Thus, this ejected precoating material is projected onto the protective surface 28, rather than onto the precoated sheet 1.

During the ablation step, the protective surface 28 is intended to contact the face 12 of the precoated sheet 1 that is being treated in a contact area located in register with the laser beam 22 as the laser beam 22 removes the at least one portion of the precoating 5 through ablation.

Figure 3:
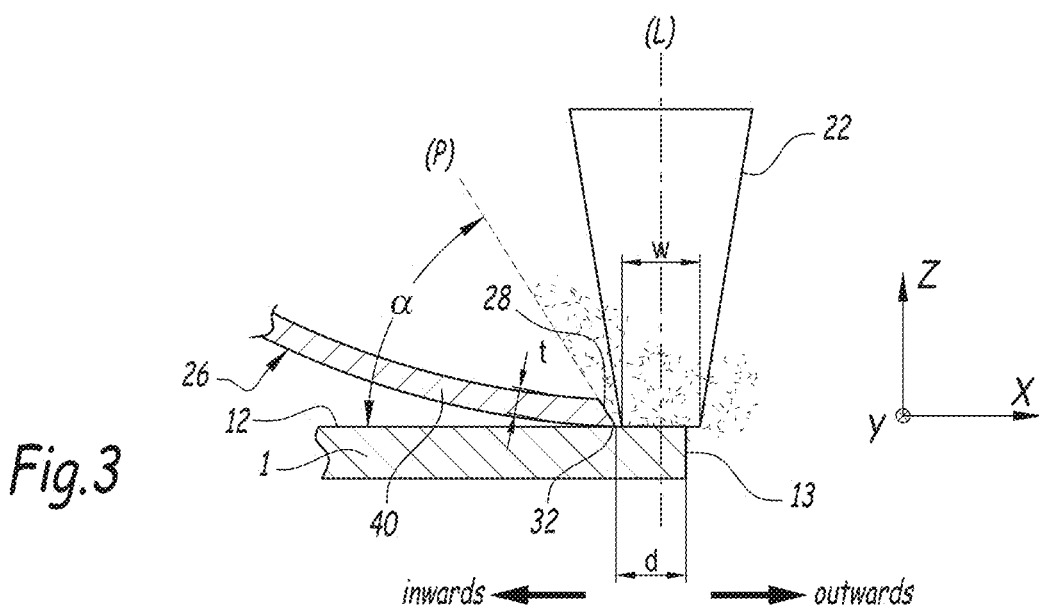
FIG. 3 is a cross-sectional view of the installation shown in FIG. 1.

More particularly, during the ablation step, the protective surface 28 is intended to be oriented relative to the precoated sheet 1 in such a manner that the plane P tangent to the protective surface 28 at the contact area forms a dihedral angle α strictly smaller than 90° with the plane of said face 12 of the precoated sheet 1, as shown more particularly in FIG. 3.

As can be seen in FIG. 3, this dihedral angle α is defined as the angle between:

the portion of the face 12 of the precoated sheet 1 located on the inside of the contact area; and the portion of said tangent plane P extending away from the precoated sheet 1, i.e. extending upwards in the embodiment shown in FIG. 3.

The protective surface 28 extends substantially parallel to the direction of ablation A. It extends inwards from the contact area and away from the precoated sheet 1.

Preferably, the shape of the protective surface 28 is such that it promotes the upwards projection of at least some of the precoating material projected onto the protective surface 28.

For this purpose, the dihedral angle α is preferably smaller or equal to 45°, and for example equal to 35°.

The dihedral angle α is for example greater than or equal to 5°.

According to one embodiment, the protective surface 28 is rectilinear when seen in cross-section in an x-z plane normal to the direction of ablation A in the contact area. The protective surface 28 is in particular planar. In this case, the tangent plane P is identical with the plane of the protective surface 28.

According to an advantageous additional embodiment, the protective surface 28 is curved when seen in cross-section in an x-z plane normal to the direction of ablation A in the contact area. In particular, the protective surface 28 is a curved surface. In this case, the effect of upward reprojection of the material from the precoating 5 by the protective surface 28 is enhanced compared to a planar protective surface 28.

More particularly, in this additional embodiment, the protective surface 28 is concave with a concavity oriented towards the laser beam 22.

Advantageously, the curve of the protective surface 28 is such that it forms a ramp which tends to project the precoating material projected onto the protective surface 28 upwards.

The protective surface 28 is formed of a material which has a low adherence with the projected precoating material. It is for example made of a material chosen among: a ceramic, in particular alumina, a carbide, copper, stainless steel and brass.

Among the above materials, alumina offers a particularly good combination between adherence and mechanical resistance.

The contact between the protective surface 28 and the precoated sheet 1 is at least a line contact. It is more particularly a contact between an edge 32 of the protective surface 28 and the face 12 of the precoated sheet 1 that is being treated.

This contact between the protective surface 28 and the precoated sheet 1 prevents ejected precoating material from accumulating on the precoated sheet 1 beneath the protective surface 28.

During ablation, the laser beam 22 creates an impact zone 34 on the precoated sheet 1. This impact zone 34 has a length 1, taken along the direction of ablation A and a width w, taken perpendicular to the direction of ablation A. It may be formed by one single laser spot having the width w and the length 1 or it may be created by a multitude of laser impulses produced by a transversely oscillating laser beam 22, which jointly form the rectangular impact zone 34 of width w and length 1.

The length of the contact area between the protective surface 28 and the precoated sheet 1, taken along the direction of ablation A, is greater than or equal to the length 1 of the impact zone 34, taken along the same direction A.

The distance d between the edge 13 of the precoated sheet 1 at which the ablation is being performed and an edge 32 of the protective surface 28 closest to the laser beam 22 is comprised between 0.4 and 1.1 times the width b of the removal zone 6.

The presence of the protective surface 28 reduces the amount of build-up deposited onto the face 12 of the precoated sheet 1 during the ablation step. Indeed, at least some of the material ejected from the precoating is deposited onto the protective surface 28, rather than on the face 12 of the sheet 1.

Figure 2:
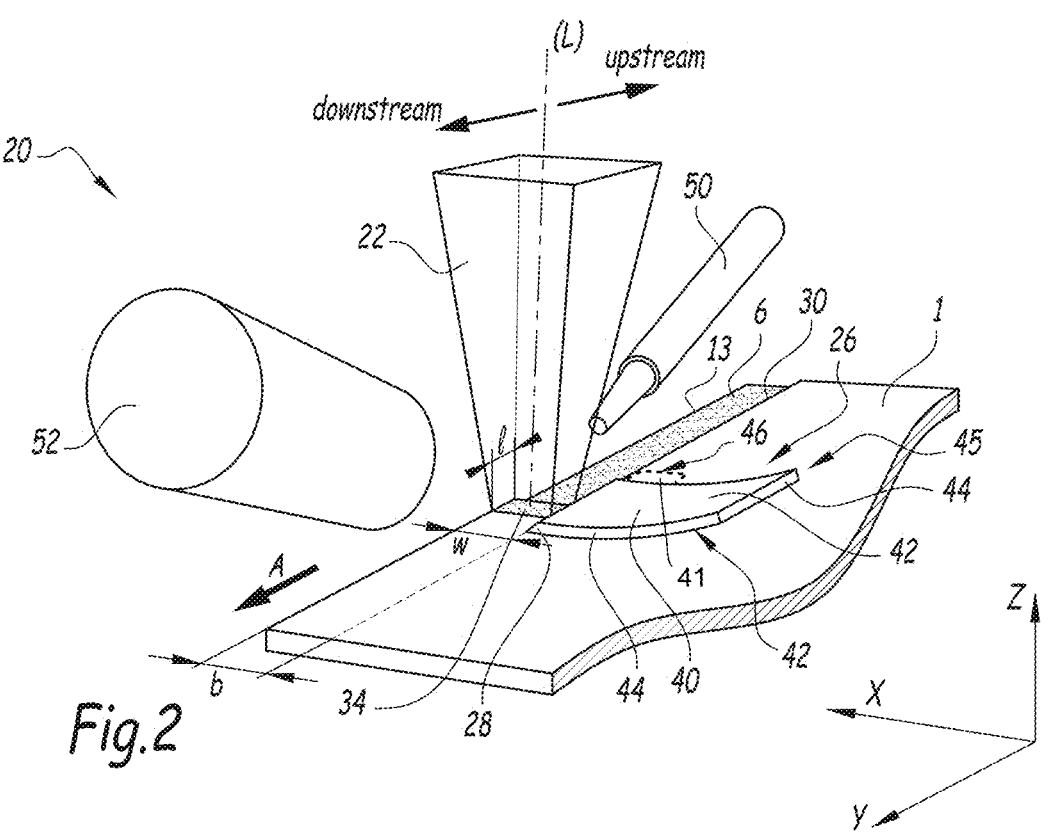
FIG. 2 is a schematic perspective representation of an installation according to a first embodiment of the invention.

In the first embodiment shown in FIGS. 2 and 3, the protective surface 28 is formed on a protective blade 40.

This protective blade 40 is substantially made from a thin sheet. It comprises two opposing faces 42 and four edge surfaces 44 extending between the two faces 42.

The two faces 42 are the two large, opposite-facing, surfaces which have a surface area defined by the length and width of the protective blade 40.

The four edge surfaces 44 include two longitudinal edge surfaces and two transverse edge surfaces. The longitudinal edge surfaces are the two small, opposite-facing, surfaces which have a surface area defined by the length and thickness of the protective blade 40. In the use configuration of the protective blade 40, the longitudinal edge surfaces extend substantially normally to the direction of ablation A.

The transverse edge surfaces are the two small, opposite-facing, surfaces which have a surface area defined by the width and thickness of the protective blade 40. In the use configuration of the protective blade 40, they extend substantially along the direction of ablation A.

The protective surface 28 is advantageously formed by an edge surface of the protective blade 40. More particularly, the protective surface 28 is formed by a transverse edge surface of the protective blade 40.

In this embodiment, the transverse edge surface carrying the protective surface 28 is in contact with the face 12 of the precoated sheet 1 over its entire length, taken along the direction of ablation A.

The protective blade 40 advantageously has a thickness smaller than or equal to 2 mm.

The protective blade 40 is advantageously made in one piece from the same material. It is in particular made from one of the materials mentioned above for the protective surface 28, i.e. from a material which has a low adherence with the projected precoating material, in particular chosen among: a ceramic, in particular alumina, a carbide, copper, stainless steel and brass.

According to an additional embodiment, the protective blade 40 may comprise, on its edge surface carrying the protective surface 28, a coating formed of a first material while the rest of the protective blade 40 is made from a second material different from the first material. More particularly, the first material may have a low adherence with the material ejected from the precoat, chosen for example among the materials listed above. The second material may be chosen to have good mechanical properties.

The installation 20 further comprises a protective blade support (not shown in the Figures) configured for applying the protective blade 40 against the precoated sheet 1 in at least the contact area during laser ablation.

The protective blade support preferably acts on the longitudinal end 45 of the protective blade 40 which is opposite to the longitudinal end 46 carrying the protective surface 28. This end will be subsequently called "inner end" 45, while the end carrying the protective surface 28 will be called "outer end" 46. When the protective blade 40 is in its use configuration, in which it is being applied to the precoated sheet 1 by the protective blade support, the inner end 45 of the blade 40 extends at a distance from the precoated sheet 1, taken along the z axis, while the outer end 46 of the blade 40 is applied against the precoated sheet 1.

In the embodiments shown in FIGS. 2 and 3, the protective blade 40 is flexible.

The flexibility of the protective blade 40 is defined by its elastic modulus and its thickness. In this embodiment, the ratio R of the elastic modulus (or Young's modulus) E of the material forming the protective blade 40 to the thickness of the protective blade 40 is comprised between 50 GPa·mm$^{-1}$ and 150 GPa·mm$^{-1}$.

With a ratio R within the above range, the protective blade 40 will be able to be applied against the precoated sheet 1 so as to form the contact area, while at the same time limiting the friction between the precoated sheet 1 and the protective blade 40 when the precoated sheet 1 and protective blade 40 are displaced relative to each other during laser ablation. The friction should be limited as much as possible, as it might impede the ablation, in particular by slowing down the displacement of the precoated sheet 1 relative to the laser beam 22 if it is too high.

According to one embodiment, the protective blade 40 has a thickness equal to about 1.2 mm and is made of brass, which has a Young's modulus comprised between 100 GPa and 140 GPa, thus resulting in a ratio R comprised between about 80 GPa·mm'$^{-1}$ and about 120 GPa·mm$^{-1}$.

If the protective blade 40 is made of a material having a higher Young's modulus than brass, such as stainless steel or alumina, its thickness is chosen to be thinner than that of a protective blade 40 made of brass, such that the ratio R stays within the prescribed range, thus resulting in an adequate flexibility of the protective blade 40.

In this embodiment, the protective blade support is configured for applying a predetermined displacement to the inner end of the protective blade 40 such that, in its use configuration, the outer end 46 thereof is applied to the precoated sheet 1 with sufficient force.

In the embodiment shown in FIGS. 2 and 3, in its use configuration, the flexible protective blade 40 curves upwards from its outer end 46 to its inner end 45. It has a substantially concave shape with a concavity oriented away from the precoated sheet 1.

The shape of the flexible protective blade 40 in the use configuration is defined by the length of the flexible protective blade 40 between its inner end 45 and its outer end 46, as well as by the R ratio of the protective blade 40 and by the displacement applied to the inner end 45 of the flexible protective blade 40 by the protective blade support.

In the embodiment shown in FIGS. 2 and 3, the protective blade 40 is in surface contact with the precoated sheet 1 over a portion of its face 42 oriented towards the precoated sheet 1. This portion extends inwards from the protective surface 28.

According to an additional embodiment, the protective blade 40 is rigid rather than flexible and the protective blade support is configured for applying the outer end 46 of the protective blade 40 onto the precoated sheet 1 with a predetermined force. In this additional embodiment, the protective blade 40 preferably extends along a plane that is angled relative to the face 12 of the precoated sheet 1.

The ablation step comprises a relative displacement of the laser beam 22 relative to the precoated sheet 1. This relative displacement may be obtained by moving the laser beam 22, while the precoated sheet 1 stays fixed, or by moving the precoated sheet 1, while the laser beam 22 stays fixed.

According to one embodiment, the protective blade 40 is fixed relative to the laser performing the ablation. In this case, in the use configuration, the protective blade 40 and the precoated sheet 1 are movable relative to one another. The contact between the protective blade 40 and the precoated sheet 1 is a sliding contact.

Optionally, in this embodiment, the upstream or back outer corner of the protective blade 40 relative to the ablation direction A is provided with a scraper 41 (shown schematically in FIG. 2). The scraper 41 is intended for scraping along the face 12 of the precoated sheet as the protective blade 40 is moved relatively to the precoated sheet 1 so as remove traces of projected material from the precoating which may have been projected between the protective blade 40 and the face 12.

Alternatively, the protective blade 40 is fixed relative to the precoated sheet 1. In this case, the protective blade 40 and the laser performing the ablation are movable relative to one another in the use configuration. In this embodiment, the length of the protective blade 40 is equal to or greater than the length of the edge 13 of the precoated sheet 1 where the ablation is to be performed.

Advantageously, and as shown schematically in FIG. 2, the installation 20 further comprises a blowing nozzle 50 arranged at the back of the laser beam 22 according to the direction of ablation A. The blowing nozzle 50 is configured for blowing a jet of gas directed downstream relative to the direction of ablation A.

The jet of gas is configured for carrying at least a fraction of the precoating material ejected from the precoating 5 during ablation downstream of the laser beam 22. The thus transported material is displaced to the front of the laser beam 22 where it is subsequently ablated by the laser beam 22 together with the precoat.

The gas is preferably an inert gas, such as, for example, argon.

The blowing nozzle 50 offers further advantages in combination with the protective surface 28 described above. Indeed, as mentioned earlier, the protective surface 28 is advantageously configured for projecting upwards at least some of the precoating material ejected inwards and projected onto the protective surface 28. This precoating material will thus be projected into the jet of gas blown from the nozzle 50 and be carried towards the front of the laser beam 22 by this jet of gas. It will then be displaced to the front of the laser beam 22 where it is subsequently removed by the laser beam 22 together with the precoating 5 itself, instead of forming a build-up on the inner edge 30 of the removal zone 6.

Furthermore, even if some of the material carried by the jet of gas is displaced on the precoated sheet 1 outside of the intended removal zone 6, it will have been cooled in the gas jet and will thus have a lower adhesion with the precoating 5 than if it had settled thereon directly without being transported by the stream of gas. Therefore, this material can be easily removed from the precoated sheet 1, for example through brushing.

Optionally, as shown schematically in FIG. 2, the installation 20 further comprises an aspiration nozzle 52 arranged at the front of the laser beam 22 according to the direction of ablation A.

The aspiration nozzle 52 is configured for sucking the ablation vapors and the precoating material projected towards the front of the laser beam 22 during ablation. It is further configured for aspirating material carried towards the front of the laser beam 22 by the jet of gas blown from the back of the laser beam 22 by the blowing nozzle 50.

Such an aspiration nozzle 52 is advantageous, as it further reduces the amount of ejected precoating material forming a build-up on the precoated sheet 1.

During the ablation step of the method according to the invention, the protective surface 28 occupies its use configuration, wherein the protective surface 28 contacts the precoated sheet 1 in a contact area located in register with the laser beam 22 as it advances relative to the precoated sheet 1, and the plane P tangent to said protective surface 28 at the contact area forms a dihedral angle α with the plane of the precoated sheet 1 as defined previously.

The protective surface 28 is arranged at a distance d from the outer edge 13 of the precoated sheet 1 as defined previously.

More particularly, with the installation 20 according to the first embodiment disclosed above, the protective blade 40 is applied against the precoated sheet 1 by the protective blade support so as to occupy its use configuration described above.

As the ablation is carried out, material from the precoating 5 is ejected towards the inner edge 30 of the removal zone 6 where the protective surface 28 is located, onto the protective surface 28 and, advantageously, at least a portion thereof is directed upwards and is carried downstream of the laser beam 22 by the jet of gas ejected from the blowing nozzle 50.

According to one embodiment, the precoated sheet 1 and the protective surface 28 are displaced relative to one another during the ablation step. In this case, the contact between the protective blade 40 and the precoated sheet 1 is a sliding contact.

According to an additional embodiment, the precoated sheet 1 and the protective surface 28 are fixed relative to one another during the ablation step. In this case, the protective surface 28 and the laser are moved relative to one another during the ablation step.

During ablation, the axis L of the laser beam 22 is perpendicular to the face 12 of the precoated sheet 1. According to an additional embodiment, the axis L is not perpendicular relative to the normal to the face 12 of the precoated sheet 1.

A method for preparing the precoated sheet 1 according to a second embodiment will now be described with reference to FIG. 4. This method is similar to the method according to the first embodiment, except for the fact that, during the ablation step, an installation 120 as shown in FIG. 4 is used.

Figure 4:
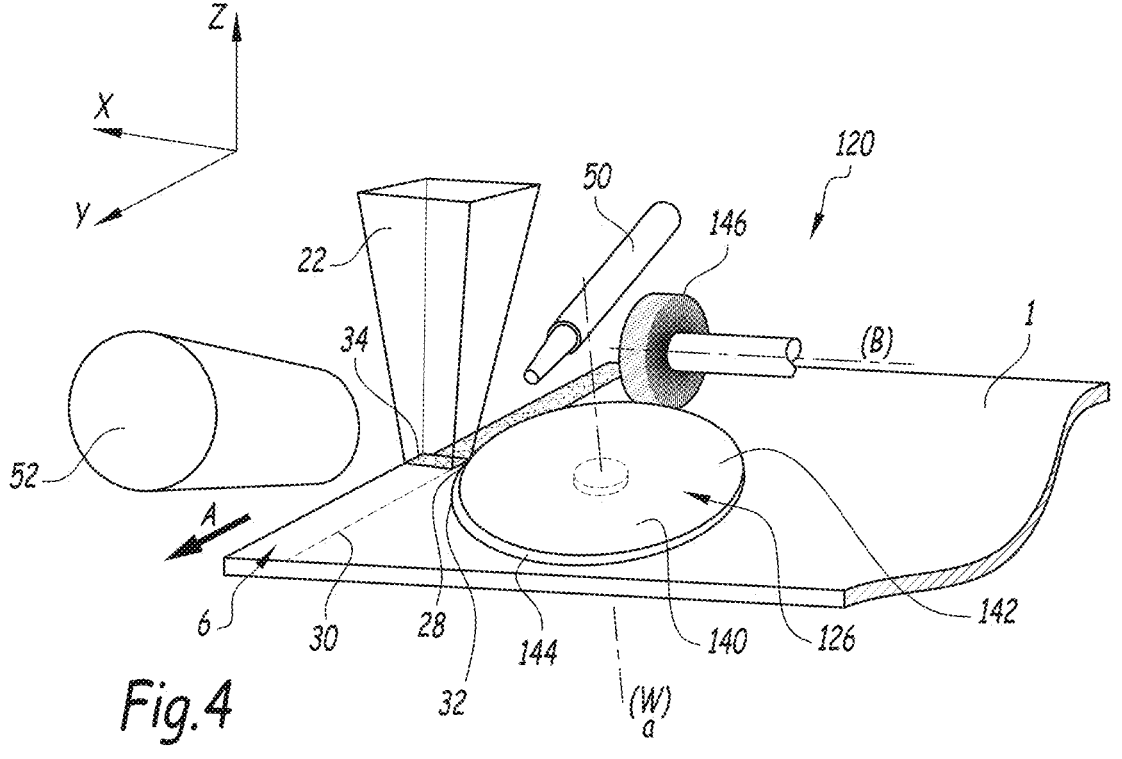
FIG. 4 is a schematic perspective representation of an installation according to a second embodiment of the invention.

FIG. 4 illustrates an installation 120 that may be used in a method according to a second embodiment. Only the differences with the installation 20 used in the method according to the first embodiment will be described. Elements analogous to elements described with regard to the first embodiment are referenced with the same reference numerals.

As can be seen in FIG. 4, in this installation 120, the protective element 126 is formed by a wheel 140, rather than a blade 40. In this embodiment, the protective surface 28 is carried by a wheel 140 instead of being carried by a blade 40.

More particularly, the wheel 140 comprises two opposite substantially disk-shaped faces 142 and a circumferential edge surface 144 extending between those two faces 142.

The protective surface 28 is formed by the circumferential edge surface 144 of the wheel 140.

Except for the difference mentioned below, the features of the protective surface 28, and in particular the dihedral angle α, as well as the material of the protective surface 28, are identical with those disclosed in relation with the first embodiment.

In this embodiment, the circumferential edge surface 144 may be frusto-conical, such that it is rectilinear when seen in cross-section along a plane normal to the direction of ablation A at the contact area.

According to an additional embodiment, it may be formed by the outer surface of a section of a solid of revolution generated by rotating a curved line about the wheel axis Wa such that it is curved when seen in cross-section along a plane normal to the direction of ablation A at the contact area.

The wheel 140 is arranged such that the circumferential edge surface 144 of the wheel 140 contacts the face 12 of the precoated sheet 1 in a contact area located in register with the laser beam 22 during the laser ablation.

Preferably, the diameter of the wheel 140 is such that the length of this contact area is equal to at least the length 1 of the impact zone 34, taken along the direction of ablation A.

The wheel 140 is rotatable about an axis Wa such that the portion of the circumferential edge surface 144 of the wheel 140 which contacts the precoated sheet 1 in the contact area located in register with the laser beam 22 changes as the wheel 140 rotates during the ablation step.

As a consequence, the precoating material ejected from the precoating towards the protective surface 28 at a given moment and which may have settled thereon will then rotate away from the contact area as the wheel 140 rotates about its axis Wa.

Advantageously, the axis Wa of the wheel 140 is inclined relative to the plane of the face 12 of the precoated sheet 1, such that only a portion of the face 142 of the wheel 140 oriented towards the precoated sheet 1 is in contact with the sheet 1. More particularly, the wheel 140 is inclined away from the face 12 of the precoated sheet 1 when moving inwards from the area of contact between the wheel 140 and the precoated sheet 1.

The wheel 140 is advantageously flexible, in the same manner as the protective blade 40 of the first embodiment. In this case, the ratio R is the ratio of the elastic modulus E of the material forming the wheel 140 to the thickness of the wheel 140, taken along the direction of the wheel axis Wa.

The wheel 140 is advantageously made in one piece in one material. This material may be chosen among the materials defined above for the protective surface 28.

According to an additional embodiment, the wheel 140 may comprise, on its circumferential edge surface 144 defining the protective surface 28, a coating formed of a first material while the rest of the wheel 140 is made from a second material different from the first material. More particularly, the first material may have a low adhesion with the material ejected from the precoat and may be chosen among the materials defined above for the protective surface 28. The second material may be chosen to have good mechanical properties.

The wheel 140 is applied against the precoated sheet 1 in the contact area located in register with the laser beam 22 by a wheel support acting on the wheel 140 in a region diametrically opposed to the contact area. In this case, in an analogous manner to the protective blade 40, in the use configuration, the wheel 140 curves upwards from the contact area towards the diametrically opposed region where the wheel support acts on the wheel 140. More particularly, the wheel 140 has a substantially concave shape with a concavity oriented away from the precoated sheet 1.

The shape of the wheel 140 in the use configuration is defined by its diameter and R ratio, as well as by the displacement applied to the wheel 140 by the wheel support.

A flexible wheel 140 is advantageous, as it increases the contact area between the wheel 140 and the precoated sheet 1, thus improving the protection against build-up.

According to an alternative embodiment, the wheel 140 is rigid. It is applied with a predetermined force against the precoated sheet 1 in the contact area located in register with the laser beam 22 by a wheel support acting on the wheel 140 in a region diametrically opposed to the contact area.

According to one embodiment, the wheel 140 is freely rotatable about the wheel axis Wa.

In this case, the rotary movement may be imparted to the wheel 140 by the translational movement of the precoated sheet 1 relative to the axis of rotation Wa of the wheel 140 and/or through the particular shape of a cleaning brush 146, as will be explained later.

According to this embodiment, the precoated sheet 1 is for example advanced in translation along the ablation direction A during ablation, while the laser beam 22 stays fixed. The wheel axis Wa is fixed relative to the laser beam 22. In this case, the wheel 140 is rotated due to its frictional contact with the precoated sheet 1 as it advances along the ablation direction A.

According to an additional embodiment, the wheel 140 is driven in rotation about the wheel axis Wa by a motor.

Advantageously, the installation 20 further comprises a brush 146 intended for cleaning the protective surface 28 during the ablation step.

More particularly, in the installation 120, the brush 146 is configured for brushing the circumferential edge surface 144 of the wheel 140 as it rotates around its axis Wa.

In the embodiment shown in FIG. 4, the brush 146 is rotatable about a brush axis B. The brush axis B is for example substantially parallel to a tangent to the wheel 140 at the contact area between the brush 146 and the circumferential edge surface 144.

In the embodiment, the brush 146 has a substantially cylindrical shape of axis B.

Advantageously, the brush 146 is driven in rotation about the brush axis B by an appropriate mechanism.

The brush 146 is intended for cleaning the protective surface 28 from the precoating material ejected during the ablation and which may have been deposited onto the protective surface 28 during ablation. The material deposited on the protective surface 28 during ablation rotates together with the wheel 140 about the wheel axis Wa and eventually reaches the brush 146, which brushes it away.

Optionally, and in particular in the embodiment where the wheel 140 is freely rotatable, the circumferential surface of the brush 146 may have a shape that is chosen so as to impart a rotary movement to the wheel 140 about the axis Wa as the brush 146 is driven in rotation about the brush axis B. This feature is advantageous, since it reduces the risk of the movement of the precoated sheets being disturbed by the rotation of the wheel 140.

The installation 120 is advantageous. Indeed, thanks to the rotation of the wheel 140 carrying the protective surface 28, the protective surface 28 is "renewed" as the wheel 140 rotates about its axis Wa and the previously deposited material can be removed during the ablation step.

Moreover, the edge of the circumferential edge surface 144 of the wheel 142 oriented towards the precoated sheet 1 tends to guide the precoated sheet 1 under the wheel 140 at the start of the ablation step, thus further improving the method.

Due to the use of the installation 120, the ablation step is slightly different from that using the first installation 20.

In particular, as the laser 22 removes the at least one portion of the precoating in the removal zone 6, the wheel 140 carrying the protective surface 28 rotates about the wheel axis Wa and the circumferential edge surface 144 of the wheel 140 is preferably being brushed by the cleaning brush 146 as the wheel 140 rotates about the wheel axis Wa.

As mentioned before, during this step, according to one embodiment, the precoated sheet 1 is moved in translation relative to the wheel axis Wa and to the laser beam 22 and the wheel 140 is rotated due to its frictional contact with the precoated sheet 1.

Optionally or alternatively, as has been explained previously, the contact of the rotating cleaning brush 146 with the circumferential surface of the wheel 140 may contribute to rotating the wheel 140 about its axis Wa.

Alternatively, during this step, the wheel 140 is driven in rotation about its axis Wa by a motor.

The method according to the second embodiment offers the same advantages as the method according to the first embodiment. It is further even more convenient, since the protective surface 28 is cleaned without having to interrupt the ablation process.

A method for preparing a precoated sheet 1 according to a third embodiment will now be explained with reference to FIG. 5. This method is similar to the method according to the second embodiment, except for the fact that, during the ablation step, an installation 220 according to a third embodiment as shown in FIG. 5 is used.

Figure 5:
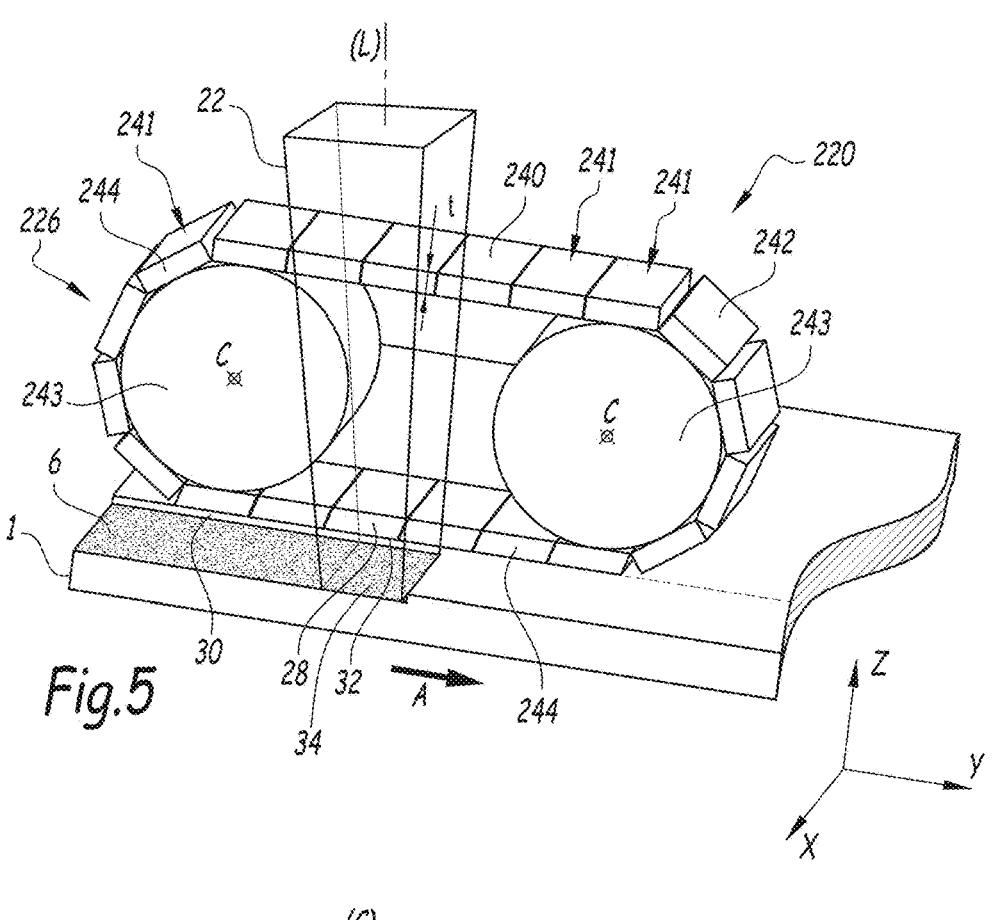
FIG. 5 is a schematic perspective representation of an installation according to a third embodiment of the invention.

FIG. 5 illustrates an installation 220 that may be used in a method according to a third embodiment. Only the differences with the installation 120 will be explained. Elements analogous to elements described with regard to the second embodiment are referenced with the same reference numerals.

In this installation 220, the protective element 226 carrying the protective surface 28 is also movable relative to the laser beam 22. However, in this embodiment, the protective element 226 is an endless belt 240 rather than a wheel 140. This endless belt 240 is movable along a predetermined path in closed loop.

More particularly, as can be seen in FIG. 5, the endless belt 240 forms a loop, whose back (or upstream) and front (or downstream) ends, taken along the direction of ablation A extend around a respective roll 243. The rolls 243 are arranged with their axes C located in a plane which is normal to the direction of ablation A.

The axes C may further extend substantially parallel to the plane of the face 12 of the precoated sheet 1. According to an additional embodiment, the axes C may be inclined relative to the face 12 of the precoated sheet 1 by an angle smaller than 90° in order to improve the contact between the edges 32 and the face 12.

The endless belt 240 is guided by the rolls 243 along a path in closed loop.

In the embodiment shown in FIG. 5, the belt 240 is articulated. It comprises a plurality of belt elements 241 connected to one another. Each belt element 241 comprises two opposite faces 242, an internal face, oriented towards the rolls 243 and an external face, oriented away from the rolls 243. It further comprises four edge surfaces extending between the two faces 242.

The four edge surfaces include two longitudinal edge surfaces and two transverse edge surfaces. The longitudinal edge surfaces extend substantially normally to the ablation direction A. The transverse edge surfaces extend substantially parallel to the ablation direction A. The outer transverse edge surfaces 244 of the belt elements 241 jointly form an outer transverse edge surface of the belt 240. The outer transverse edge surface of the belt 240 forms the protective surface 28. It extends substantially parallel to the direction of ablation A.

The features of the protective surface 28, and in particular the dihedral angle α and the material of the protective surface 28, are identical with those disclosed in relation with the first embodiment.

In this embodiment, the thickness t of the protective element, i.e. of the endless belt 241, corresponds to the thickness of each of the belt elements 241.

The belt elements 241 are advantageously flexible, in the same manner as the protective blade 40 of the first embodiment. In this case, the ratio R is the ratio of the elastic modulus E of the material forming the belt elements 241 to the thickness t of the belt elements 241.

According to an additional embodiment, the endless belt 240 may be rigid.

Each belt element 241 is advantageously made in one piece in one material, for example chosen from the list mentioned previously in the case of the protective blade 40.

According to an additional embodiment, each belt element 241 may comprise, on its outer transverse edge surface 244, a coating formed of a first material while the rest of the belt element 241 is made from a second material different from the first material. More particularly, the first material may have a low adhesion with the material ejected from the precoat. The first material may be chosen among the first material disclosed previously for the protective surface. The second material may be chosen to have good mechanical properties.

The belt 240 is arranged in such a way that, during ablation, the outer transverse edge surfaces 244 of at least some of the belt elements 241 contact the precoated sheet 1 in at least a contact area located in register with the laser beam 22. The contact is preferably a line contact between the precoated sheet 1 and an edge of the outer transverse edge surfaces 244.

The outer transverse edge surfaces 244 of the belt elements 241 are, according to one embodiment, planar, such that the protective surface 28 is rectilinear when seen in cross-section along a plane normal to the direction of ablation in the contact area.

According to an additional embodiment, the outer transverse edge surfaces 244 are curved surfaces, such that the protective surface 28 is curved when seen in cross-section in an x-z plane normal to the direction of ablation A in the contact area. More particularly, the outer transverse edge surfaces 244 of the belt elements 241 are concave with a concavity oriented towards the laser beam 22. Advantageously, the curve of the protective surface 28 is such that it forms a ramp which tends to project the precoating material projected onto the protective surface 28 upwards.

The length of protective surface 28, taken along the direction of ablation A, located in register with the laser beam 22 at a given time is preferably greater or equal to the length 1 of the impact zone 34, taken along the same direction A.

Advantageously, the rolls 243 are supported in their position by an appropriate support installation.

As can be seen in FIG. 5, depending on the length of the belt elements 241, taken along the direction of ablation A, one or several belt elements 241 might be located along the impact zone 34 of the laser beam 22 and contact the precoated sheet 1 in a contact area located in register with the laser beam 22 in a given position of the belt 240.

According to one embodiment, the precoated sheet 1 is for example translated along the ablation direction A during ablation, while the laser beam 22 stays fixed. The axes C of the rolls 243 are fixed relative to the laser beam 22. In this embodiment, the belt 240 may be moved along its path about the rolls 243 due to its frictional contact with the precoated sheet 1 as it advances along the ablation direction A.

According to an additional embodiment, the rolls 243 are driven in rotation about their axes C by a motor and are configured for moving the belt 240 along its path.

Advantageously, the installation 220 further comprises a brush (not shown in FIG. 5) intended for brushing the outer transverse edge surface of the belt as it moves along its path. This brush is intended for removing the precoating material ejected during the ablation and which may have been deposited onto the protective surface 28 during ablation. The material deposited on an outer transverse edge surface 244 of a given belt element 241 during ablation moves together with the belt 240 and eventually reaches the brush, which brushes it away from the outer transverse edge surface 244.

The brush may for example be analogous to the brush 146 shown in FIG. 4.

In the installation 220, the brush may be driven in rotation about a brush axis. As the belt 240 moves along its path, the brush is arranged so as to brush the outer transverse edge surfaces 244 of the belt elements 241 located away from the face 12 of the precoated sheet 1, i.e. which are not in contact with the face 12 of the precoated sheet 1.

The brush has not been shown in FIG. 5 for simplification purposes.

In the embodiment illustrated in FIG. 5, the belt 240 is an articulated belt. According to an additional embodiment, the belt 240 is not articulated. It is formed from one continuous strip of material. In this case, the protective surface 28 is formed by the outer transverse edge surface of the belt 240, which extends substantially parallel to the direction of ablation A.

The features of the protective surface 28, and in particular the dihedral angle α and the material of the protective surface 28, are identical to those disclosed in relation with the first embodiment.

The preparation method according to the third embodiment is analogous to the method according to the second embodiment, except for the fact that it uses the installation 220 according to the third embodiment. It further offers analogous advantages.

A method for preparing a precoated sheet 1 according to a fourth embodiment will now be explained with reference to FIG. 6. This method is similar to the method according to the second embodiment, except for the fact that, during the ablation step, an installation 320 according to a fourth embodiment as shown in FIG. 6 is used.

Figure 6:
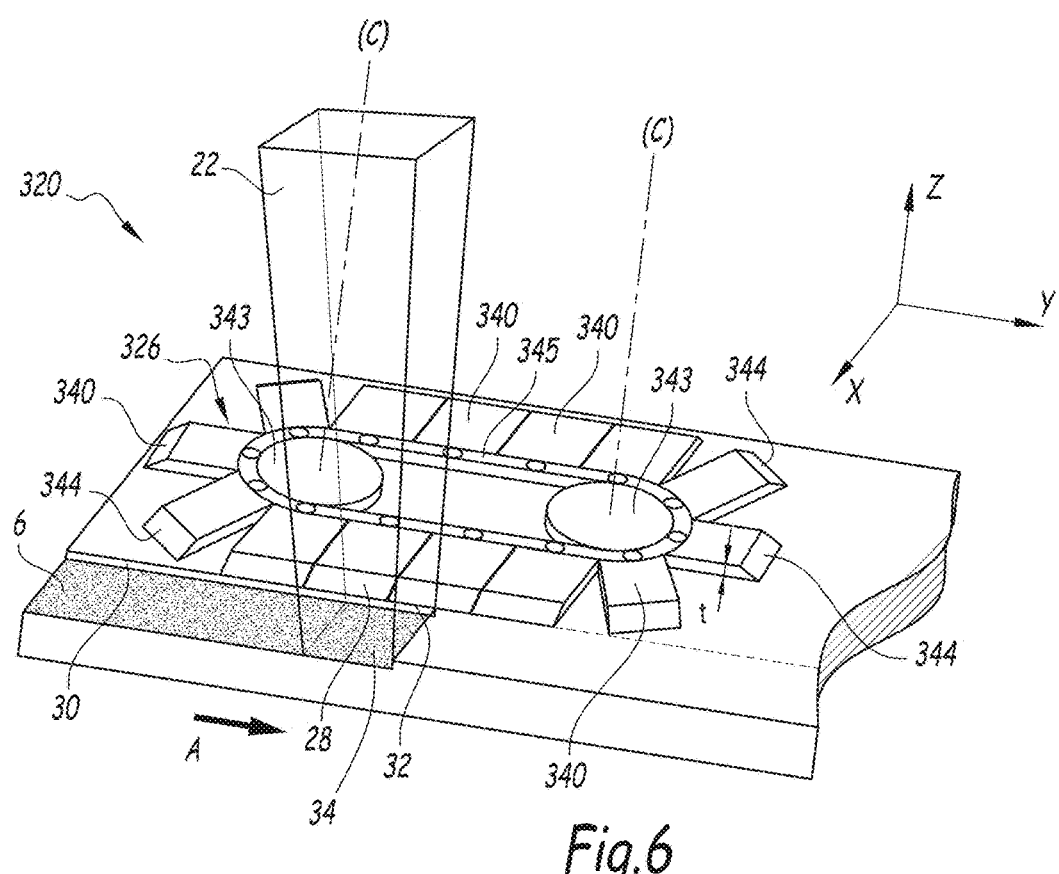
FIG. 6 is a schematic perspective representation of an installation according to a fourth embodiment of the invention.

FIG. 6 illustrates an installation 320 according to a fourth embodiment that may be used in a method according to a fourth embodiment. Only the differences with the installation 120 used in the method according to the second embodiment will be described. Elements analogous to elements described with regard to the second embodiment are referenced with the same reference numerals.

In this installation 320, the protective element 326 carrying the protective surface 28 is also movable relative to the laser beam 22. However, in this embodiment, the protective element 326 is formed by a plurality of elongated tabs 340, movable along a path in closed loop relative to the laser beam 22.

More particularly, in this embodiment, the installation 320 comprises an endless drive element 345 which is intended for moving the elongated tabs 340 along their path.

The endless drive element 345 is for example a chain or a belt.

More particularly, as can be seen in FIG. 6, the endless drive element 345 forms a loop, whose back and front ends, taken along the direction of ablation A, extend around a respective roll 343.

According to one embodiment, the axes C of the rolls 343 extend substantially perpendicular to the face 12 of the precoated sheet 1. According to an additional embodiment, the axes C of the rolls 343 may be inclined relative to the normal to the face 12 of the precoated sheet 1 in order to improve the contact between the edges 32 and the face 12.

The endless drive element 345 is guided along its path by the rolls 343.

The elongated tabs 340 are attached to the endless drive element 345. More particularly, the elongated tabs 340 are distributed along the circumference of the endless drive element 345, each tab 340 having a first end attached to the endless drive element 345 and a second free end located opposite the first end. The tabs 340 are elongated in a direction from the first end to the second end. Therefore, the distance between the first and second ends corresponds to the length of the elongated tabs 340.

The elongated tabs 340 extend radially entirely outside of the loop formed by the endless drive element 345.

Each second free end comprises an end surface 344. The end surfaces 344 of the second free ends of the tabs 340 jointly form a radially outer edge surface of the protective element 326. This radially outer edge surface of the protective element 326 forms the protective surface 28. It is driven to move along the predetermined path in closed loop by the endless drive element 345.

The features of the protective surface 28, and in particular the dihedral angle α and the material of the protective surface 28, are identical with those disclosed in relation with the first embodiment.

In this embodiment, the thickness t of the protective element 326 corresponds to the thickness of each its elongated tabs 340.

Each elongated tab 340 is advantageously flexible, in the same manner as the protective blade 40 of the first embodiment. In this case, the ratio R is the ratio of the elastic modulus E of the material forming the elongated tab 340 to the thickness t of the elongated tab 340.

According to an additional embodiment, the elongated tabs 340 may be rigid.

Each elongated tab 340 is advantageously made in one piece in one material. It may in particular be made from one of the materials listed previously for the protective blade 40.

According to an additional embodiment, each elongated tab 340 may comprise, on its radially outer edge surface comprising the protective surface 28, a coating formed of a first material while the rest of the elongated tab 340 is made from a second material different from the first material. More particularly, the first material may have a low adhesion with the material ejected from the precoat. It may be chosen among the materials listed previously for the protective surface 28. The second material may be chosen to have good mechanical properties.

The elongated tabs 340 further have two opposite faces, one of which faces the sheet 1 while the other faces in the opposite direction.

The elongated tabs 340 are arranged in such a way that, during ablation, the radially outer edge surfaces 344 of at least some of the elongated tabs 340 contact the precoated sheet 1 in at least a contact area located in register with the laser beam 22. The contact is preferably a line contact between the precoated sheet 1 and an edge of the radially outer edge surface of the protective element 340. The radially outer edge surfaces 344 of the elongated tabs 340 in register with the laser beam 22 extend substantially parallel to the direction of ablation A.

The length of protective surface 28, taken along the direction of ablation A, which is in register with the laser beam 22 at a given time is preferably greater or equal to the length 1 of the impact zone 34, taken along the same direction A.

The outer edge surfaces 344 of the tabs 340 are, according to one embodiment, planar, such that the protective surface 28 is rectilinear when seen in cross-section along a plane normal to the direction of ablation in the contact area.

According to an additional embodiment, the outer edge surfaces 344 are curved surfaces, such that the protective surface 28 is curved when seen in cross-section in an x-z plane normal to the direction of ablation A in the contact area. More particularly, the outer edge surfaces 344 are concave with a concavity oriented towards the laser beam 22. Advantageously, the curve of the protective surface 28 is such that it forms a ramp which tends to project the precoating material projected onto the protective surface 28 upwards.

Advantageously, the rolls 343 are supported in their position by an appropriate support installation.

As can be seen in FIG. 6, depending on the width of the elongated tabs 340, taken along the direction of ablation A, one or several elongated tabs 340 might be located in register with the laser beam 22 and contact the precoated sheet 1 in a contact area in a given position of the endless drive element 345.

In this embodiment, the rolls 343 are driven in rotation about their axes C by a motor and the rolls 343 are configured for moving the endless drive element 345 and therefore the elongated tabs 340 along their paths.

Advantageously, the installation 320 further comprises a brush 146 intended for brushing the radially outer edge surface of the protective element 26 as it moves along its path. This brush is analogous to the ones described with reference to the installations 120 and 220 according to the second and third embodiments. It has not been shown in FIG. 6.

The preparation method according to the fourth embodiment is analogous to the method according to the second embodiment, except for the fact that it uses the installation 320 according to the fourth embodiment. It further offers analogous advantages.

The installations 120, 220 and 320 may comprise blowing nozzles 50 and/or aspiration nozzles 52 as described with reference to the first installation 20. These nozzles 50, 52 have not been shown in FIGS. 4 to 6 in order to simplify the drawings.

The inventors prepared comparative precoated sheet samples by forming a removal zone 6 having a width of 0.9 mm using a laser ablation method such as disclosed in EP 2 007 545, without using a protective surface.

More particularly, the laser ablation was carried out using a laser with a nominal average power of 450 W delivering 38 ns pulses and creating a square impact zone of 1 mm by 1 mm. The constant speed of movement in translation of the laser beam relative to the sheet was 6 m/min.

Figure 7:
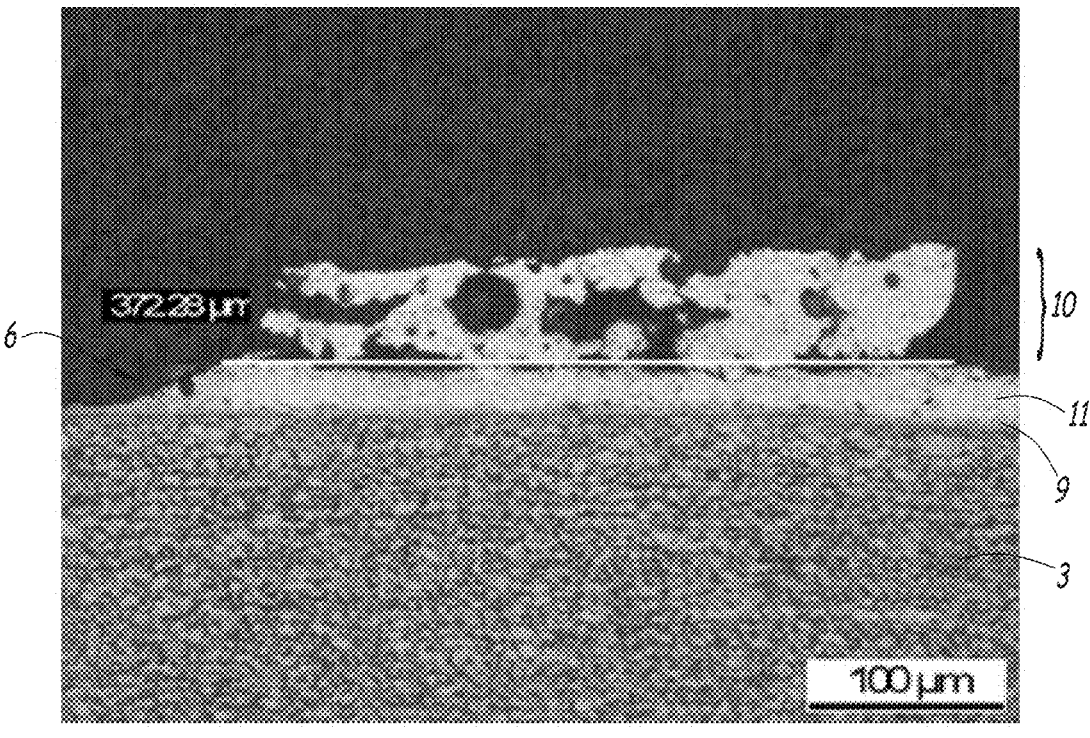
FIGS. 7 to 9 are micrographs of sheets whose precoating has been partially removed using a laser ablation method according to the prior art.
Figure 8:
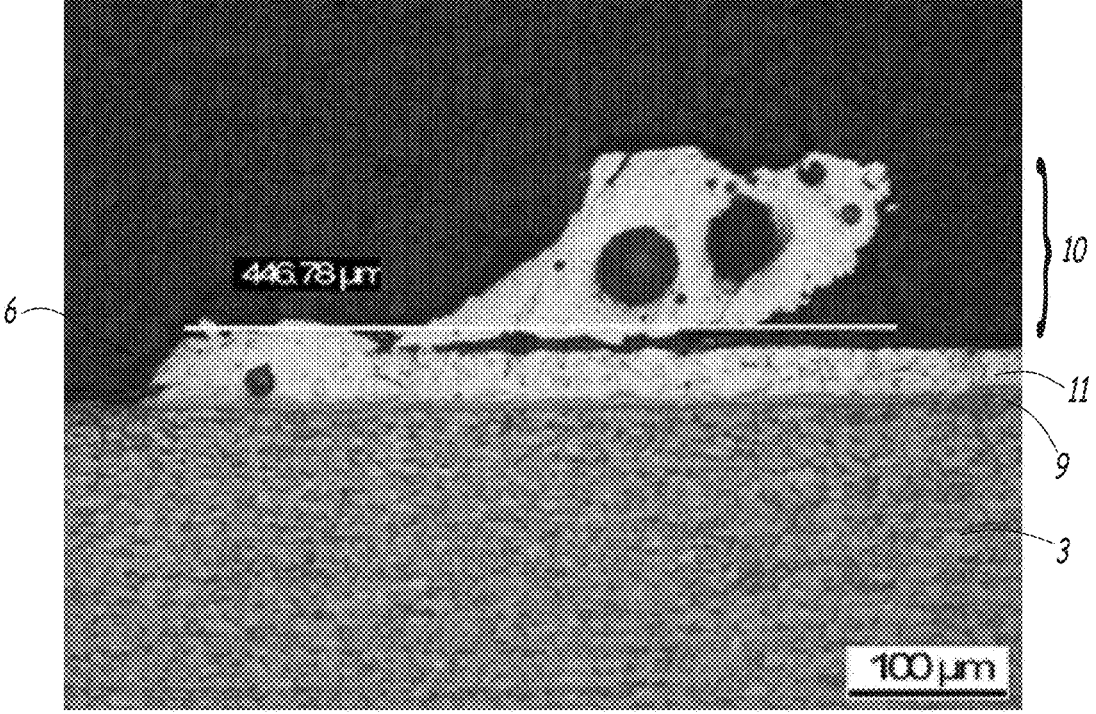
Figure 9:
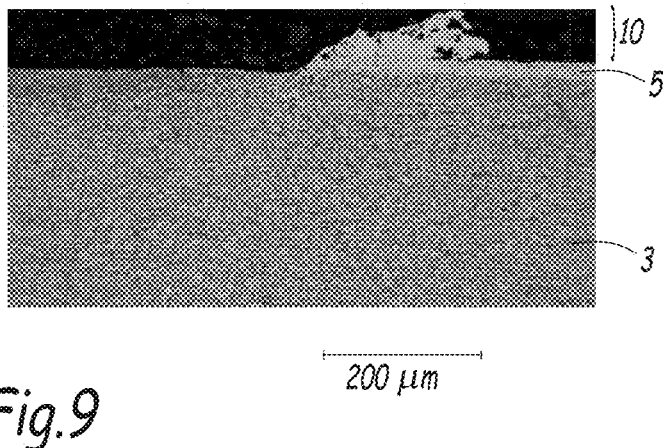
Figure 10:
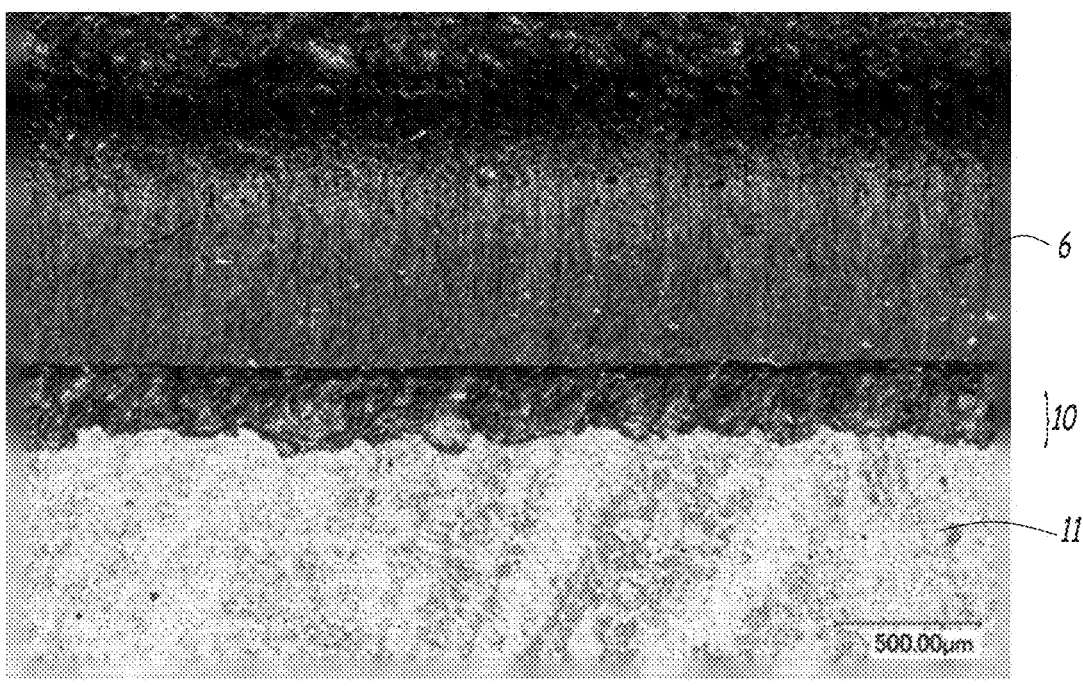
FIG. 10 is a photograph from above of the sheet corresponding to the micrograph of FIG. 9.

FIGS. 7 to 9 are micrographs of three such sheets, taken along a plane perpendicular to the direction of ablation. FIG. 10 is a photograph from above of the sample corresponding to the micrograph of FIG. 9.

Based on these comparative samples, the inventors measured that the build-up 10 has a typical volume characterized by a height varying between 40 μm and 200 μm and a width varying between 40 μm and 600 μm.

The inventors further prepared precoated sheet samples using the method according to the first embodiment of the invention.

These sheets were prepared in an installation according to the first embodiment of the invention. The protective blade 40 was made of brass and had a thickness of 1.2 mm. The dihedral angle α was chosen equal to 35°. The operating parameters of the laser beam (speed, power, pulse during and impact size), as well as the width of the removal zone 6 were identical to those in the comparative examples.

Figure 11:
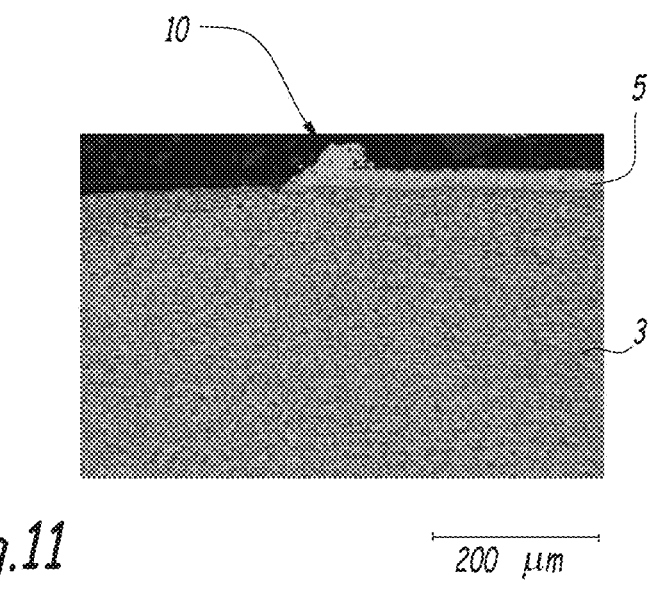
FIG. 11 is a micrograph of a sheet prepared using the method according to the invention.
Figure 12:
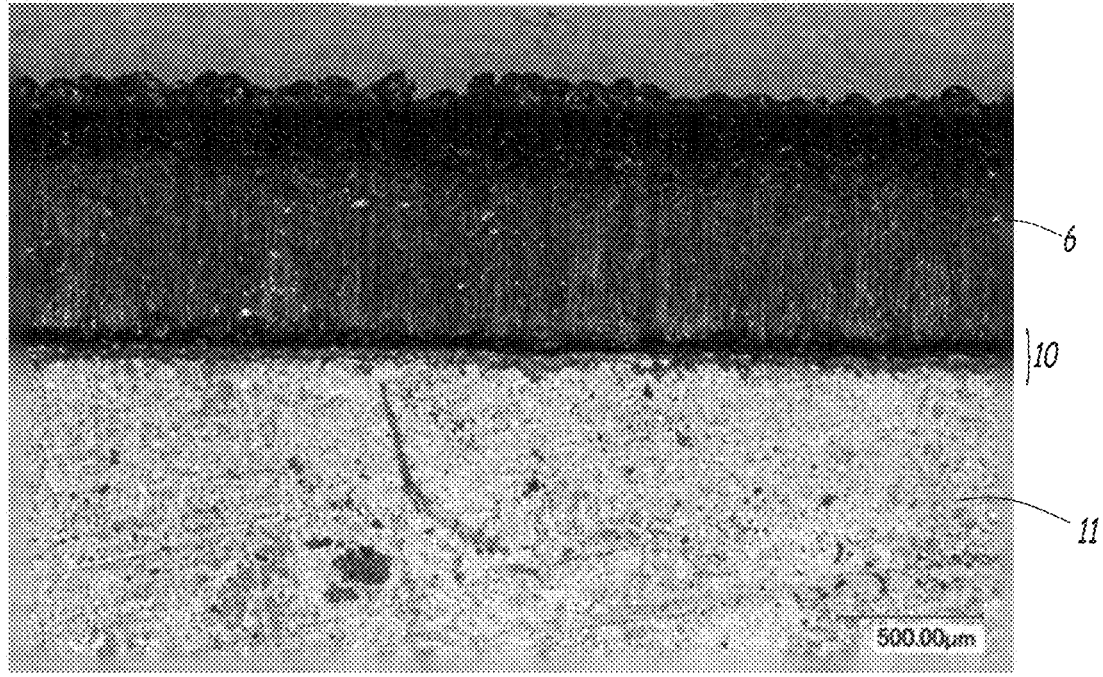
FIG. 12 is a photograph from above of the sheet corresponding to the micrograph of FIG. 11.

FIG. 11 is a micrograph obtained from such a sheet sample according to the invention, taken along a plane perpendicular to the direction of ablation A, and FIG. 12 is a photograph of this sheet taken from above.

Based on the samples prepared using the method according to the invention, the inventors measured that, in this case, the resulting build-up 10 has a volume characterized by a height varying between 0 μm and 100 μm and a width varying between 0 μm and 100 μm.

Therefore, the method according to the invention results in a significant reduction of the build-up volume as compared to laser ablation methods which do not include the use of a protective surface.

What is claimed is:

1. A method for preparing a precoated sheet in view of its welding to another sheet, the method comprising the following successive steps:

providing a precoated sheet comprising a metallic substrate with a precoating on at least one face of the precoated sheet; and removing through laser ablation at least one portion of the precoating on the at least one face of the precoated sheet in a removal zone, the laser ablation being performed in a direction of ablation, the laser ablation being carried out in an installation, wherein the installation comprises at least one protective element comprising a protective surface, and during the laser ablation, the protective surface contacts the precoated sheet in register with a laser beam as the laser beam removes the at least one portion of the precoating through laser ablation, the contact between the protective surface and the precoated sheet defining a contact area, the contact area delimiting an outside of the precoated sheet including the at least one portion of the precoating and an inside of the precoated sheet on an opposite side of the contact area as the outside, a plane tangent to the protective surface at the contact area forms a dihedral angle with a plane of the at least one face of the precoated sheet, the dihedral angle being strictly smaller than 90°, the dihedral angle being the angle between a portion of the at least one face of the precoated sheet located on an inside of the contact area and a portion of the tangent plane extending away from the precoated sheet, and the protective surface is located on a trajectory of precoating material ejected sideward toward an inner edge of the removal zone during the laser ablation, a path of the laser beam not being located along the inside of the precoated sheet.

2. The method of claim 1, further comprising blowing a jet of gas at a back of the laser beam, occurring simultaneously with the laser ablation, by means of a blowing nozzle, the jet of gas being directed in a downstream direction relative to the direction of ablation.

3. The method of claim 1, wherein the dihedral angle is smaller than or equal to 45°.

4. The method of claim 1, wherein a distance between an edge of the precoated sheet at which the laser ablation is being performed and an edge of the protective surface closest to the laser beam is between 0.4 and 1.1 times a width of the removal zone.

5. The method of claim 1, further comprising suctioning of material generated by the laser ablation at a front of the laser beam, occurring simultaneously with the laser ablation, by means of an aspiration nozzle.

6. The method of claim 1, wherein the at least one protective element includes a ratio of elastic modulus of material forming the at least one protective element to a thickness of the at least one protective element between 50 GPa·mm$^{-1}$ and 150 GPa·mm$^{-1}$.

7. The method of claim 1, wherein the protective surface is planar.

8. The method of claim 1, wherein the protective surface is curved.

9. The method of claim 8, wherein the protective surface is concave with a concavity oriented towards the laser beam.

10. The method of claim 1, wherein the laser ablation comprises a relative displacement of the protective surface to the precoated sheet as the laser beam removes the at least one portion of the precoating through laser ablation.

11. The method of claim 10, wherein the contact between the precoated sheet and the protective surface is a sliding contact.

12. The method of claim 1, wherein the protective surface is fixed relative to the precoated sheet during the laser ablation.

13. The method of claim 1, wherein the at least one protective element is a protective blade and the protective surface is formed on a transverse edge surface of the protective blade, extending parallel to the direction of ablation.

14. The method of claim 13, wherein a back corner of the protective blade relative to the direction of ablation is provided with a scraper, the scraper scraping along the at least one face of the precoated sheet so as to remove traces of projected material from the precoating which may have been projected between the protective blade and the at least one face of the precoated sheet.

15. The method of claim 1, wherein the at least one protective element moves relative to the laser beam during the laser ablation.

16. The method of claim 15, wherein the installation further comprises a brush which brushes the protective surface during the laser ablation.

17. The method of claim 1, wherein the at least one protective element is a wheel, which rotates about a wheel axis during the laser ablation, the wheel comprises a circumferential edge surface including the protective surface.

18. The method of claim 1, wherein the at least one protective element is an endless belt comprising an outer transverse edge surface extending parallel to the ablation direction and comprising the protective surface, wherein the endless belt moves relative to the laser beam during the laser ablation.

19. The method of claim 18, wherein the endless belt is an articulated belt comprising a plurality of belt elements.

20. The method of claim 1, wherein the installation further comprises an endless drive element and the at least one protective element is formed by a plurality of elongated tabs distributed along a circumference of the endless drive element, each elongated tab includes a first end attached to the endless drive element and a second free end located opposite the first end, each second free end comprising an end surface, the end surface of the second free end of each elongated tab jointly form a radially outer edge surface of the at least one protective element comprising the protective surface, the plurality of elongated tabs being moved by the endless drive element relative to the laser beam during the laser ablation.

21. The method of claim 1, wherein the precoating is either a layer of aluminum, a layer of aluminum alloy or a layer of aluminum-based alloy.

22. The method of claim 1, wherein an axis of the laser beam during the laser ablation is inclined relative to normal to the at least one face of the precoated sheet.

23. An installation for preparing a precoated sheet in view of its welding to another sheet comprising:

a laser configured for emitting a laser beam for removing at least one portion of a precoating of a precoated sheet through laser ablation, and at least one protective element comprising a protective surface, the protective surface being configured for contacting the precoated sheet in register with the laser beam as the laser beam removes the at least one portion of the precoating through laser ablation, the contact between the protective surface and the precoated sheet defining a contact area, and the protective surface being arranged within the installation such that a plane tangent to the protective surface at the contact area forms a dihedral angle with a plane of at least one face of the precoated sheet, the dihedral angle being strictly smaller than 90°, the contact area delimiting an outside of the precoated sheet including the at least one portion of the precoating and an inside of the precoated sheet on an opposite side of the contact area as the outside, the dihedral angle being the angle between at least one portion of the at least one face of the precoated sheet located on the inside of the precoated sheet and a portion of the tangent plane extending away from the precoated sheet, and wherein the protective surface is located on a trajectory of precoating material ejected sideward toward an inner edge of a removal zone during laser ablation, a path of the laser beam not being located along the inside of the precoated sheet.

24. The installation of claim 23, further comprising a blowing nozzle, configured for blowing a jet of gas at a back of the laser beam, the jet of gas being directed in a downstream direction relative to a direction of ablation.

25. The installation of claim 23, wherein the dihedral angle is smaller than or equal to 45°.

26. The installation of claim 23, wherein the at least one protective element is a protective blade, the protective surface being formed on a transverse edge surface of the protective blade, extending parallel to a direction of ablation.

27. The installation of claim 26, wherein a back corner of the protective blade relative to the direction of ablation is provided with a scraper, the scraper being configured for scraping along the at least one face of the precoated sheet so as to remove traces of projected material from the precoating which may have been projected between the protective blade and the at least one face of the precoated sheet.

28. The installation of claim 23, wherein the at least one protective element moves relative to the laser beam.

29. The installation of claim 27, further comprising a brush configured for brushing the protective surface during laser ablation.

30. The installation of claim 28, wherein the at least one protective element is a wheel, the wheel comprising a circumferential surface comprising the protective surface, and wherein the wheel is rotatable about a wheel axis.

31. The installation of claim 28, wherein the at least one protective element is an endless belt comprising an outer transverse edge surface extending parallel to the ablation direction and comprising the protective surface, the endless belt being movable relative to the laser beam.

32. The installation of claim 28, further comprising an endless drive element, and wherein the protective element is formed by a plurality of elongated tabs, distributed along a circumference of the endless drive element, each elongated tab having a first end attached to the endless drive element and a second free end located opposite the first end, each second free end comprising an end surface, the end surface of the second free end of the elongated tab jointly form a radially outer edge surface of the at least one protective element comprising the protective surface, the endless drive element being configured for moving the plurality of elongated tabs relative to the laser beam.

33. The installation of claim 23, wherein the at least one protective element includes a ratio of elastic modulus of material forming the at least one protective element to a thickness of the at least one protective element between 50 GPa·mm$^{-1}$ and 150 GPa·mm$^{-1}$.

34. The installation of claim 23, wherein the protective surface is planar.

35. The installation of claim 23, wherein the protective surface is curved.

* * * * *